United States Patent
Ding et al.

(10) Patent No.: US 12,340,525 B2
(45) Date of Patent: Jun. 24, 2025

(54) HIGH-DEFINITION MAP CREATION METHOD AND DEVICE, AND ELECTRONIC DEVICE

(71) Applicant: Beijing Baidu Netcom Science Technology Co., Ltd., Beijing (CN)

(72) Inventors: Wendong Ding, Beijing (CN); Yingying Qin, Beijing (CN); Yangyang Dai, Beijing (CN); Yucheng Zhang, Beijing (CN); Liang Peng, Beijing (CN); Guowei Wan, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 400 days.

(21) Appl. No.: 17/970,285

(22) Filed: Oct. 20, 2022

(65) Prior Publication Data
US 2023/0042968 A1   Feb. 9, 2023

(30) Foreign Application Priority Data
Oct. 28, 2021   (CN) .......................... 202111260229.5

(51) Int. Cl.
*G06K 9/00*   (2022.01)
*G01S 17/89*   (2020.01)
(Continued)

(52) U.S. Cl.
CPC .............. *G06T 7/32* (2017.01); *G01S 17/89* (2013.01); *G06T 7/11* (2017.01); *G06T 7/70* (2017.01);
(Continued)

(58) Field of Classification Search
CPC ........... G06T 17/05; G06T 2207/10028; G06T 2207/20021; G06T 2207/20072;
(Continued)

(56) References Cited

U.S. PATENT DOCUMENTS

| | | | | |
|---|---|---|---|---|
| 11,145,080 B2* | 10/2021 | Chen | ...................... | G06V 10/84 |
| 2016/0071278 A1* | 3/2016 | Leonard | .................. | G06T 7/579 |
| | | | | 348/47 |

(Continued)

FOREIGN PATENT DOCUMENTS

| | | |
|---|---|---|
| CN | 106910242 A | 6/2017 |
| CN | 109118582 A | 1/2019 |

(Continued)

OTHER PUBLICATIONS

The extended European Search Report for European application No. 2202930.8, dated Mar. 28, 2023.
(Continued)

*Primary Examiner* — Hadi Akhavannik
(74) *Attorney, Agent, or Firm* — Quinn IP Law

(57) ABSTRACT

A high-definition map creation method includes: obtaining point cloud data collected with respect to a target region, the point cloud data including K frames of point clouds and an initial pose of each frame of point cloud, K being an integer greater than 1; associating the K frames of point clouds with each other in accordance with the initial pose to obtain a first point cloud relation graph of the K frames of point clouds; performing point cloud registration on the K frames of point clouds in accordance with the first point cloud relation graph and the initial pose to obtain a target relative pose of each frame of point cloud in the K frames of point clouds; and splicing the K frames of point clouds in accordance with the target relative pose to obtain a point cloud map of the target region.

17 Claims, 3 Drawing Sheets

(51) Int. Cl.
  *G06T 7/11* (2017.01)
  *G06T 7/32* (2017.01)
  *G06T 7/70* (2017.01)
  *B60W 60/00* (2020.01)

(52) U.S. Cl.
  CPC ....... *B60W 60/001* (2020.02); *B60W 2556/40* (2020.02); *G06T 2207/10028* (2013.01); *G06T 2207/20021* (2013.01); *G06T 2207/30241* (2013.01); *G06T 2207/30252* (2013.01)

(58) Field of Classification Search
  CPC . G06T 2207/20221; G06T 2207/30241; G06T 2207/30252; G06T 2210/56; G06T 7/11; G06T 7/32; G06T 7/70; G06T 7/77
  See application file for complete search history.

(56) References Cited

U.S. PATENT DOCUMENTS

| | | | | |
|---|---|---|---|---|
| 2019/0301873 | A1* | 10/2019 | Prasser | G01C 21/3848 |
| 2020/0209009 | A1* | 7/2020 | Zhang | G06F 3/04815 |
| 2020/0378808 | A1* | 12/2020 | Platonov | G01B 11/24 |
| 2021/0004933 | A1 | 1/2021 | Wong et al. | |
| 2021/0158546 | A1* | 5/2021 | He | G01S 17/89 |
| 2021/0327128 | A1 | 10/2021 | Yu et al. | |
| 2022/0368879 | A1* | 11/2022 | Fleureau | H04N 13/161 |
| 2023/0042968 | A1* | 2/2023 | Ding | G06T 7/70 |

FOREIGN PATENT DOCUMENTS

| | | | |
|---|---|---|---|
| CN | 109754459 | A | 5/2019 |
| CN | 109949399 | A | 6/2019 |
| CN | 110940994 | A | 3/2020 |
| CN | 111461980 | A | 7/2020 |
| CN | 111461981 | A | 7/2020 |
| CN | 111462275 | A | 7/2020 |
| CN | 111524168 | A | 8/2020 |
| CN | 111771229 | A | 10/2020 |
| CN | 111784835 | A | 10/2020 |
| CN | 111966773 | A | 11/2020 |
| CN | 112509142 | A | 3/2021 |
| CN | 112561975 | A | 3/2021 |
| CN | 112762923 | A | 5/2021 |
| JP | 2010276485 | A | 12/2010 |
| WO | 20201549664 | A1 | 8/2020 |

OTHER PUBLICATIONS

Siheng et al., "3D Point Cloud Processing and Learning for Autonomous Driving", Cornell University Library, 201 Olin Library Cornell University Ithaca, NY14853, Mar. 2020.

Estrada et al., "Hierarchical SLAM: Real-Time Accurate Mapping of Large Environments", IEEE Transactions on Robotics, IEEE Service Center, Piscataway, NJ, US, vol. 21, No. 4, Aug. 2005, p. 588-596.

Grisetti et al., "Robust optimization of factor graphs by using condensed measurements", Intelligent Robots and Systems (IROS), 2012 IEEE/RSJ International Conference on, IEEE, Oct. 7, 2012, p. 581-588.

Han et al., "Robust RGB-D Camera 1-15 Tracking using Optimal Key-frame Selection", 2020 IEEE International Conference on Robotics and Automation (ICRA), IEEE, May 31, 2020, p. 6275-6281.

Fernandes et al., "Visual and Inertial Data Fusion for Globally Consistent Point Cloud Registration" Proceedings—Brazilian Symposium on Computer Graphics and Imageprocessing, IEEE Computer Society, Los Alamitos, CA, US, Aug. 5, 2013, pp. 210-217.

Chinese First Office Action for Chinese application No. CN2021112602295, dated Jun. 19, 2023.

Shi et al., "Reference-plane-based approach for accuracy assessment of mobile mapping point clouds," ScienceDirect, www.elsevier.com/locate/measurement, 2021.

"Research on Key Technologies of Localization and Navigation Based on Visual SLAM," A Dissertation Submitted to Zhejiang University for the Degree of Master of Engineering, Jan. 12, 2020.

Zhou Leimeng, "Research on Mapping Technology for ORB-SLAM," Dissertation Submitted to Hangzhou Dianzi University for the Degree of Master, Mar. 2019.

Japanese Office Action for Japanese application No. JP2022-171511, dated Sep. 5, 2023.

Kiyoshi et al., "Motion estimation of three-dimensional point groups based on alignment using ICP," Law and Political University, Department of Information Science.

* cited by examiner

HIGH-DEFINITION MAP CREATION METHOD AND DEVICE, AND ELECTRONIC DEVICE

CROSS-REFERENCE TO RELATED APPLICATION

This application claims a priority of the Chinese patent application No. 202111260229.5 filed on Oct. 28, 2021, which is incorporated herein by reference in its entirety.

TECHNICAL FIELD

The present disclosure relates to the field of data processing technology, in particular to the field of autonomous driving technology, more particular to a high-definition map creation method, a high-definition map creation device, and an electronic device.

BACKGROUND

High-definition map, also called as high-precision map, is used by an autonomous vehicle. The high-definition map includes accurate vehicle position information and a wealth of road element data information, so as to help the vehicle to predict road surface information, e.g., gradient, curvature, course, etc., thereby to avoid any potential risk. Along with the development of autonomous driving technology, the high-definition map is required to cover a whole city or even a whole country. For the reconstruction of the high-definition map, usually point cloud data needs to be collected and divided into blocks on the basis of geographical distribution, and then the high-definition map is created in accordance with the blocks.

Currently, during the creation of the high-definition map, usually consistency among the blocks needs to be optimized, and then the optimized blocks are spliced to create the high-definition map.

SUMMARY

An object of the present disclosure is to provide a high-definition map creation method, a high-definition map creation device, and an electronic device, so as to solve problems in the related art.

In a first aspect, the present disclosure provides in some embodiments a high-definition map creation method, including: obtaining point cloud data collected with respect to a target region, the point cloud data including K frames of point clouds and an initial pose of each frame of point cloud, K being an integer greater than 1; associating the K frames of point clouds with each other in accordance with the initial pose, so as to obtain a first point cloud relation graph of the K frames of point clouds; performing point cloud registration on the K frames of point clouds in accordance with the first point cloud relation graph and the initial pose, so as to obtain a target relative pose of each frame of point cloud in the K frames of point clouds; and splicing the K frames of point clouds in accordance with the target relative pose, so as to obtain a point cloud map of the target region.

In a second aspect, the present disclosure provides in some embodiments a high-definition map creation device, including: a first obtaining module configured to obtain point cloud data collected with respect to a target region, the point cloud data including K frames of point clouds and an initial pose of each frame of point cloud, K being an integer greater than 1; an association module configured to associate the K frames of point clouds with each other in accordance with the initial pose, so as to obtain a first point cloud relation graph of the K frames of point clouds; a point cloud registration module configured to perform point cloud registration on the K frames of point clouds in accordance with the first point cloud relation graph and the initial pose, so as to obtain a target relative pose of each frame of point cloud in the K frames of point clouds; and a splicing module configured to splice the K frames of point clouds in accordance with the target relative pose, so as to obtain a point cloud map of the target region.

In a third aspect, the present disclosure provides in some embodiments an electronic device, including: at least one processor, and a memory in communication with the at least one processor. The memory is configured to store therein an instruction to be executed by the at least one processor, and the instruction is executed by the at least one processor so as to implement the high-definition map creation method in the first aspect.

In a fourth aspect, the present disclosure provides in some embodiments a non-transitory computer-readable storage medium storing therein a computer instruction. The computer instruction is executed by a computer so as to implement the high-definition map creation method in the first aspect.

In a fifth aspect, the present disclosure provides in some embodiments a computer program product including a computer program. The computer program is executed by a processor so as to implement the high-definition map creation method in the first aspect.

It should be understood that, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The following drawings are provided to facilitate the understanding of the present disclosure, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

First Embodiment

Figure 1:
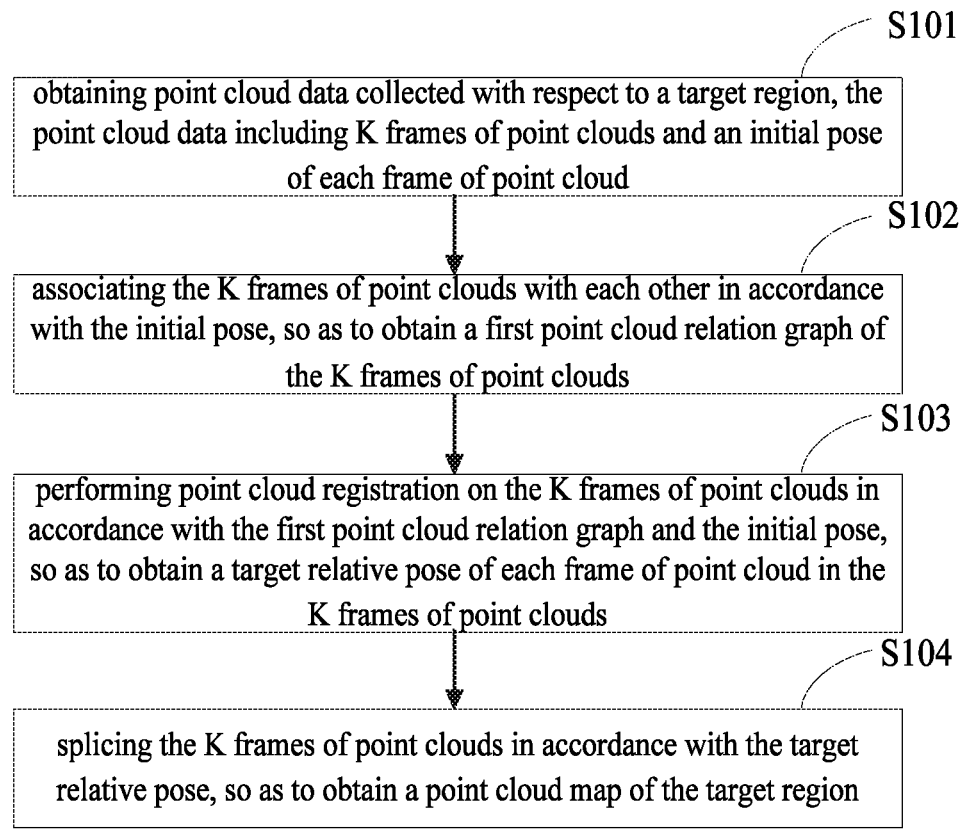
FIG. 1 is a flow chart of a high-definition map creation method according to a first embodiment of the present disclosure.

As shown in FIG. 1, the present disclosure provides in this embodiment a high-definition map creation method, which includes the following steps.

Step S101: obtaining point cloud data collected with respect to a target region, the point cloud data including K frames of point clouds and an initial pose of each frame of point cloud, K being an integer greater than 1.

In this embodiment of the present disclosure, the high-definition map creation method relates to the field of data processing technology, in particular to the field of autonomous driving technology, and it is widely applied in such scenarios as automatic pilot driving and smart driving. The high-definition map creation method in this embodiment of the present disclosure is implemented by a high-definition map creation device. The high-definition map creation device is configured in any electronic device so as to implement the high-definition map creation method. The electronic device is a server or a terminal, which will not be particularly defined herein.

In this step, the target region refers to any region having a spatial concept, e.g., country, city, downtown or district, which will not be particularly defined herein.

The point cloud data refers to point cloud data in the target region, and it is used as initial data to create a point cloud map of the target region. The point cloud map refers to a high-definition map created through three-dimensional (3D) points, and it is used for autonomous driving or smart driving.

The point cloud data includes K frames of point clouds. The point cloud refers to a set of vectors in a 3D coordinate system, and usually these vectors are represented by coordinates X, Y and Z to indicate a shape of an outer surface of an object. A frame of point cloud differs from a frame of image in that the frame of point cloud is 3D multi-media data while the frame of image is 2D multi-media data. Points within a certain range of the surface of the object are scanned through Visual LiDAR to obtain a frame of point cloud. The K frames of point clouds collected with respect to the target region is usually used to indicate a shape of an outer surface of the target region, so a point cloud map of the target region is created in accordance with the K frames of point clouds.

Each frame of point cloud has an initial pose, and correspondingly, the point cloud data also includes the initial pose of each frame of point cloud. The initial pose refers to a position when the frame of point cloud is collected. When the point cloud data is collected by a vehicle, a position of the vehicle is used to indicate the initial pose of the frame of point cloud when the frame of point cloud is collected. The initial pose of one frame of point cloud is in a 3D form, e.g., the initial pose includes longitude, latitude and altitude. An object of the present disclosure is to determine a relative pose of each frame of point cloud, i.e., determine a splicing position of the frames of point clouds, in accordance with the K frames of point clouds as well as a chronological order of the collected frames of point clouds and a spatial distance between the frames of point clouds represented by the initial poses of the K frames of point clouds, so as to splice the K frames of point clouds in accordance with the relative pose of each frame of point cloud, thereby to create the point cloud map of the target region.

The point cloud data is obtained through LiDAR Simultaneous Localization And Mapping (SLAM), Global Positioning System (GPS) or Inertial Measurement Unit (IMU).

To be specific, Visual LiDAR, Global Navigation Satellite System (GNSS), GPS or IMU is mounted on a collection device, e.g., vehicle, and the frames of point clouds are collected by the vehicle when the vehicle runs in the target region. In addition, the vehicle is preliminarily positioned through a positioning technology, e.g., GPS+IMU, Odometry or SLAM, so as to obtain the point cloud data.

For the data collected by the vehicle when the vehicle runs in the target region, it is directly determined as the point cloud data collected with respect to the target region, or post-processed through Visual LiDAR and a GNSS position processing technology to obtain a group of temporally-consecutive initial trajectories (including the initial poses of the frames of point clouds) with confidence estimation as well as the frames of point clouds after movement compensation, thereby to obtain the point cloud data collected with respect to the target region. The obtained point cloud data is used as basic data for the creation of the high-definition map.

The point cloud data is obtained with respect to one point cloud collection trajectory in the target region. In order to enable the point cloud data to completely cover the target region, the point cloud data is also obtained with respect to a plurality of point cloud collection trajectories in the target region, which will not be particularly defined herein. In addition, in the case that the point cloud data is obtained with respect to the plurality of point cloud collection trajectories in the target region, data collected with respect to each point cloud collection trajectory is down-sampled, so as to filter out some useless or unavailable data, e.g., data collected when the vehicle stays at a crossing. In this way, it is able to perform distributed parallelization on the data in batches in accordance with the point cloud collection trajectories, thereby to improve the data processing efficiency as well as the creation efficiency of the high-definition map.

It should be appreciated that, the high-definition map creation device obtains the point cloud data in various ways. For example, the point cloud data is collected through Visual LiDAR, GNSS, GPS or IMU, or the point cloud data with respect to the target region is received from the other electronic device, e.g., an apparatus mounted on the vehicle, or the pre-stored point cloud data with respect to the target region is obtained, or the point cloud data with respect to the target region is downloaded from the network.

Step S102: associating the K frames of point clouds with each other in accordance with the initial pose, so as to obtain a first point cloud relation graph of the K frames of point clouds.

In this step, the K frames of point clouds are associated with each other in time and/or space dimensions in accordance with the initial pose, so as to establish an association relation among the K frames of point clouds, thereby to obtain the first point cloud relation graph of the K frames of point clouds. The first point cloud relation graph is used to represent the association relation among the K frames of point clouds, and it is expressed as a k-dimensional tree (kd-tree) or a node graph, which will not be particularly defined herein. As a tree-like data structure, kd-tree is used to store instance points in a k-dimensional space, so as to retrieve the instance points rapidly.

For example, for a same point cloud collection trajectory in the target region, the frames of point clouds collected successively are associated with each other, i.e., the frames of point clouds collected at adjacent time points are associated with each other along a direction of the point cloud collection trajectory. In other words, when the direction of the point cloud collection trajectory in the target region is a longitudinal direction, this association mode is called as longitudinal association.

For example, when the data is collected in accordance with a point cloud collection trajectory to obtain three consecutive frames of point clouds A1, A2 and A3, the point cloud A1 is associated with the point cloud A2, and the point cloud A2 is associated with the point cloud A3, so as to obtain an association relation among the three frames of point clouds.

For another example, a collection distance between the frames of point clouds is determined in accordance with the initial pose of each frame of point cloud, and then each frame of point cloud is associated with the other frame of point cloud spaced apart from the frame of point cloud by a distance within a predetermined range, e.g., 30 m. In this association mode, the point clouds are associated with each other in accordance with a spatial distance.

For example, when the point cloud data includes three frames of point clouds B1, B2 and B3, a collection distance between the point cloud B1 and the point cloud B2 is 15 m, a collection distance between the point cloud B2 and the point cloud B3 is 18 m and a collection distance between the point cloud B1 and the point cloud B3 is 33 m, the point cloud B1 is associated with the point cloud B2, and the point cloud B2 is associated with the point cloud B3, so as to obtain an association relation among the three frames of point clouds.

For yet another example, for different point cloud collection trajectories in the target region, the frames of point clouds collected on a same road segment with respect to different point cloud collection trajectories are associated with each other. In other words, a first target frame of point cloud collected in accordance with a first point cloud collection trajectory is associated with a second target frame of point cloud collected in accordance with a second point cloud collection trajectory. The first point cloud collection trajectory and the second point cloud collection trajectory are different point cloud collection trajectories with respect to the target region, the second target frame of point cloud is located in a line perpendicular to a direction of the first point cloud collection trajectory, and an initial pose of the second target frame of point cloud is adjacent to an initial pose of the first target frame of point cloud. In other words, when the direction perpendicular to the direction of the first point cloud collection trajectory with respect to the target region is a transverse direction, the other frame of point cloud close to the first target frame of point cloud, e.g., the second target frame of point cloud directly or indirectly adjacent to the first target frame of point cloud, is searched in the point cloud data corresponding to the other point cloud collection trajectory through transverse distance suppression, so as to obtain a minimum set of point clouds with respect to a same road segment, and then associate the searched second target frame of point cloud with the first target frame of point cloud. The first target frame of point cloud is any frame of point cloud on the first point cloud collection trajectory. This association mode is called as transverse association.

For example, the point cloud collection trajectories with respect to the target region include two point cloud collection trajectories C1 and C2, the point cloud data collected on the target road segment in accordance with the point cloud collection trajectory C1 includes a point cloud D1, a point cloud D2 and a point cloud D3, and the point cloud data collected on the target road segment in accordance with the point cloud collection trajectory C2 includes a point cloud E1, a point cloud E2 and a point cloud E3. With respect to any frame of point cloud on the point cloud collection trajectory C1, the other frame of point cloud adjacent to the frame of point cloud is searched on the point cloud collection trajectory C2. When the point cloud D1 is closer to the point cloud E1, the point cloud D2 is closer to the point cloud E2 and the point cloud D3 is closer to the point cloud E3, the point cloud D1 is associated with the point cloud E1, the point cloud D2 is associated with the point cloud E2, and the point cloud D3 is associated with the point cloud E3, so as to obtain an association relation among these six frames of point clouds.

In addition, in order to perform distributed parallelization and improve the creation efficiency of the high-definition map, the K frames of point clouds are divided into M blocks in accordance with the initial pose of each frame of point cloud, and adjacent blocks include at least one same frame of point cloud, i.e., the point clouds in the adjacent blocks overlap each other so as to ensure the data association between the adjacent blocks. The frames of point clouds in each block are associated with each other in time and/or space dimensions, so as to create the association relation among the frames of point clouds in the block. Then, the association relation among the K frames of point clouds is created in accordance with the data association among the blocks and the data association of the frames of point clouds in each block, so as to obtain the first point cloud relation graph of the K frames of point clouds.

Step S103: performing point cloud registration on the K frames of point clouds in accordance with the first point cloud relation graph and the initial pose, so as to obtain a target relative pose of each frame of point cloud in the K frames of point clouds.

In this step, the point cloud registration refers to point cloud fusion, i.e., the pose of each frame of point cloud is optimized to obtain the relative pose of each frame of point cloud, thereby to perform the point cloud fusion in accordance with the relative pose of each frame of point cloud. In other words, through determining a relative position of each frame of point cloud in the K frames of point clouds, it is able to splice the frames of point clouds in accordance with the relative position, thereby to obtain a point cloud map through fusion.

The point cloud registration is performed on the K frames of point clouds is performed in accordance with the first point cloud relation graph and the initial pose of each frame of point cloud through Maximum A Posteriori (MAP) or Maximum Likelihood Estimation (MLE), so as to obtain the target relative pose of each frame of point cloud in the K frames of point clouds.

Taking MAP as an example, a point cloud registration problem, i.e., a point cloud fusion problem, may be converted into an MAP problem. The initial pose of each frame of point cloud in the K frames of point cloud is taken as prior of the MAP problem, the first point cloud relation graph is taken as a registration measurement condition for the point clouds, and registration optimization on the point clouds is taken as likelihood of the MAP problem.

During the optimization of the MAP problem, by means of a Bayes structure, each frame of point cloud in the K frames of point clouds is taken as a node, so as to obtain K nodes corresponding to the K frames of point clouds respectively. An association relation among the frames of point clouds in the first point cloud relation graph is taken as an edge constraint on the K nodes, and a pose of each of the K nodes is optimized in accordance with the initial pose. In addition, the MAP problem may also be converted into a nonlinear least square problem, and iterative optimization is performed on the nonlinear least square problem through a nonlinear optimization library Ceres so as to obtain a first relative pose of each node in the K nodes.

The first relative pose is determined as a target relative pose of the point cloud. Alternatively, after determining the first relative pose, an association relation of a target node in the K nodes is determined in accordance with the first relative pose, the association relation is taken as an edge constraint on the target node to optimize the pose of the target node, and then the optimized relative pose of the target node is returned to each node so as to obtain the target relative pose of the point cloud. A specific mode will be described hereinafter, and thus will not be particularly defined herein.

In addition, during the point cloud registration, a certain measurement merely affects several stages around the measurement, so a certain frame of point cloud is merely associated with the frames of point clouds around it, i.e., it merely affects the other frames of point clouds around it. Hence, during the point cloud registration, the K frames of point clouds are divided into a plurality of blocks so as to perform the distributed parallelization, thereby to improve the creation efficiency of the high-definition map.

Step S104: splicing the K frames of point clouds in accordance with the target relative pose, so as to obtain a point cloud map of the target region.

In this step, a splicing position of each frame of point cloud is determined in accordance with the target relative pose of the frame of point cloud, and then the K frames of point clouds are spliced in accordance with the splicing position of each frame of point cloud, so as to obtain the point cloud map of the target region.

According to the first embodiment of the present disclosure, the point cloud data collected with respect to the target region is obtained, and the point cloud data includes the K frames of point clouds and the an initial pose of each frame of point cloud. Next, the K frames of point clouds are associated with each other in accordance with the initial pose, so as to obtain the first point cloud relation graph of the K frames of point clouds. Next, the point cloud registration is performed on the K frames of point clouds in accordance with the first point cloud relation graph and the initial pose, so as to obtain the target relative pose of each frame of point cloud in the K frames of point clouds. Then, the K frames of point clouds are spliced in accordance with the target relative pose, so as to obtain the point cloud map of the target region. As a result, through the point cloud registration on the K frames of point clouds in accordance with the first point cloud relation graph and the initial pose, it is able to prevent each block from being deformed due to a problem in edge matching of the blocks, thereby to improve the quality of the created high-definition map.

In a possible embodiment of the present disclosure, the associating the K frames of point clouds with each other in accordance with the initial pose so as to obtain the first point cloud relation graph of the K frames of point clouds includes: dividing the K frames of point clouds into M blocks in accordance with the initial pose, adjacent blocks including at least one same frame of point cloud, M being a positive integer; associating the frames of point clouds in each block with each other, so as to obtain a second point cloud relation graph of the block; and associating the M second point cloud relation graphs of the M blocks with each other in accordance with the at least one same frame of point cloud, so as to obtain the first point cloud relation graph.

In this embodiment of the present disclosure, the K frames of point clouds are divided into M blocks in accordance with the initial pose of each frame of point cloud, and the adjacent blocks include at least one frame of point cloud, i.e., the point clouds in the adjacent blocks overlap each other so as to ensure the data association between the blocks.

To be specific, when dividing the K frames of point clouds into the blocks, each block represents a district segment, i.e., the frames of point clouds collected in the district segment belong to one block. Usually, each block includes a district segment having a length of one kilometer, and a block to which a current frame of point cloud belongs is determined in accordance with a size of the block and the initial pose of the current frame of point cloud.

In order to ensure the data association between the adjacent blocks, the frames of point clouds arranged at edges of the adjacent blocks and collected with respect to a same road segment are included in each of the adjacent blocks, i.e., the adjacent blocks include at least one same frame of point cloud collected with respect to the same road segment.

With respect to each block, the frames of point clouds are associated with each other in time and/or space dimensions, so as to create the association relation among the frames of point clouds in the block, thereby to obtain the second point cloud relation graph corresponding to the block.

The second point cloud relation graph is used to represent the association relation among the frames of point clouds in one block, and it is expressed as a kd-tree or a node graph, which will not be particularly defined herein.

Next, the association relation among the K frames of point clouds is created in accordance with the data association among the blocks and the data association among the frames of point clouds in each block, so as to obtain the first point cloud relation graph of the K frames of point clouds. For example, the K frames of point clouds are divided into two blocks A and B. The block A includes three frames of point clouds A1, A2 and A3, A1 is associated with A2, and A2 is associated with A3. The block B includes three frames of point clouds A1, B2 and B3, A1 is associated with B2, and B2 is associated with B3. Based on the data association between the blocks A and B (i.e., the association relation through the point cloud A1) and the data association in each block, in the association relation of the K frames of point clouds, A1 is associated with A2, A2 is associated with A3, A1 is associated with B2, and B2 is associated with B3.

In this embodiment of the present disclosure, the K frames of point clouds are divided into the M blocks in accordance with the initial pose, and the adjacent blocks include at least one same frame of point cloud. Next, the frames of point clouds in each block are associated with each other, so as to obtain the second point cloud relation graph of the block. Then, the M second point cloud relation graphs of the M blocks are associated with each other in accordance with the at least one same frame of point cloud, so as to obtain the first point cloud relation graph. As a result, it is able to perform the distributed parallel on the data association of the blocks, thereby to improve the automatic creation efficiency of the high-definition map as well as a scale of the high-definition map.

In a possible embodiment of the present disclosure, the dividing the K frames of point clouds into the M blocks in accordance with the initial pose includes: dividing the K frames of point clouds into N sub-blocks in accordance with the initial pose and target sub-trajectories, each sub-block including frames of point clouds collected on one target sub-trajectory, each target sub-trajectory being a consecutive trajectory on any point cloud collection trajectory of L point cloud collection trajectories with respect to the target region, one point cloud collection trajectory including one target sub-trajectory or a plurality of consecutive target sub-trajectories, L being a positive integer, and N being an integer greater than 1; and dividing the N sub-blocks into M blocks in accordance with a positional relationship among the sub-blocks, each block including the sub-blocks in a space with a predetermined size, at least a part of sub-blocks in a first block being different from sub-blocks in a second block, the first block being any block in the M blocks, and the second block being a block in the M blocks different from the first block.

In this embodiment of the present disclosure, the K frames of point clouds are divided in accordance with the target sub-trajectory. To be specific, each point cloud collection trajectory in the L point cloud collection trajectories with respect to the target region is divided into one point cloud collection trajectory or a plurality of consecutive point cloud collection trajectories, and the frames of point clouds collected on the point cloud collection trajectory belong to one sub-block, so as to obtain N sub-blocks.

For example, one point cloud collection trajectory with respect to the target region is divided into a plurality of target sub-trajectories in accordance with a certain distance (e.g., 10 m to 15 m), and a plurality of frames of point clouds collected on each consecutive target sub-trajectory belong to one sub-block. A frame of point cloud collected at a center of the target sub-trajectory is called as a key frame of point cloud.

Next, the sub-blocks are divided into M blocks in accordance with the positional relationship among the sub-blocks. To be specific, several sub-blocks spatially closest to each other form a block. For example, in a common straight-road scenario, each block includes sub-blocks at a corresponding position collected on each point cloud collection trajectory, and in a crossing scenario, each block includes sub-blocks in proximity to the crossing. In this way, it is able to ensure the associativity among the created blocks.

In this embodiment of the present disclosure, the K frames of point clouds are divided into N sub-blocks in accordance with the initial pose and target sub-trajectories, each sub-block includes frames of point clouds collected on one target sub-trajectory, each target sub-trajectory is a consecutive trajectory on any point cloud collection trajectory of L point cloud collection trajectories with respect to the target region, and one point cloud collection trajectory includes one target sub-trajectory or a plurality of consecutive target sub-trajectories. Then, the N sub-blocks are divided into M blocks in accordance with the positional relationship among the sub-blocks, each block includes the sub-blocks in the space with the predetermined size, at least a part of sub-blocks in a first block are different from sub-blocks in the second block, the first block is any block in the M blocks, and the second block is a block in the M blocks different from the first block. As a result, it is able to ensure the associativity among the created blocks, thereby to improve the quality of the created high-definition map.

In addition, during the subsequent point cloud registration, the poses of the point clouts are optimized in a hierarchical manner based on a three-layered data structure consisting of the frame of point cloud, the sub-block and the block. In other words, the pose of each frame of point cloud is optimized, and then it is propagated from bottom to top in a layer-by-layer manner. An association relation among third target frames of point clouds is determined in accordance with an optimized relative pose of each third target frame of point cloud (e.g., the key frame of point cloud in the sub-block), and then the association relation is taken as an edge constraint on the sub-blocks. The pose of the third target frame of point cloud is continuously optimized to modify the relative poses of a part of the frames of point clouds. When a modification amount of each frame of point cloud is smaller than a predetermined threshold during the bottom-to-top propagation, the relative pose of each frame of point cloud is propagated from top to bottom to each frame of point cloud at a lower layer, thereby to obtain the target relative pose of each frame of point cloud in the K frames of point clouds. In this way, it is able to optimize the pose in a hierarchical manner, thereby to improve the point cloud registration accuracy as well as a point cloud fusion effect.

In a possible embodiment of the present disclosure, the associating the frames of point clouds in each block with each other so as to obtain the second point cloud relation graph includes at least one of: with respect to each frame of point cloud in the block, associating point clouds in the block spaced apart from the point cloud by a distance within a predetermined range with each other, so as to obtain the second point cloud relation graph; with respect to any point cloud collection trajectory in the target region, associating the frames of point clouds in the block collected at adjacent time points in accordance with the point cloud collection trajectory and a direction of the point cloud collection trajectory, so as to obtain the second point cloud relation graph; or associating a first target frame of point cloud in the block collected in accordance with a first point cloud collection trajectory with a second target frame of point cloud in the block collected in accordance with a second point cloud collection trajectory, so as to obtain the second point cloud relation graph, the first point cloud collection trajectory and the second point cloud collection trajectory being different point cloud collection trajectories with respect to the target region, the second target frame of point cloud being located in a line perpendicular to a direction of the first point cloud collection trajectory, and an initial pose of the second target frame of point cloud being adjacent to an initial pose of the first target frame of point cloud.

In this embodiment of the present disclosure, the frames of point clouds in each block are associated with each other on a block basis, or the frames of point clouds in each block are associated with each other in time and/or space dimensions, so as to create the association relation among the frames of point clouds in the block, thereby to obtain the second point cloud relation graph.

This association mode is similar to a mode of associating the K frames of point clouds as a hole, and it also includes longitudinal association, transverse association and association on the basis of a spatial distance, which will not be particularly defined herein.

In this embodiment of the present disclosure, through dividing the K frames of point clouds into blocks and associating the frames of point clouds in each block with each other, it is able to perform the distributed parallelization on the data association, thereby to remarkably increase the automatic creation efficiency of the high-definition map as well as the scale of the high-definition map, and achieve the scale production of the high-definition map.

In a possible embodiment of the present disclosure, the performing the point cloud registration on the K frames of point clouds in accordance with the first point cloud relation graph and the initial pose so as to obtain the target relative pose of each frame of point cloud in the K frames of point clouds includes: taking each frame of point cloud in the K frames of point clouds as a node, so as to obtain K nodes corresponding to the K frames of point clouds respectively; taking an association relation among the frames of points in the first point cloud relation graph as an edge constraint on the K nodes, and optimizing a pose of each node in the K nodes in accordance with the initial pose, so as to obtain a first relative pose of each node in the K nodes; and determining the target relative pose of each frame of point cloud in the K frames of point clouds in accordance with the first relative pose of each node in the K nodes.

In this embodiment of the present disclosure, the point cloud registration is performed on the K frames of point clouds through MAP, so as to obtain the target relative pose of each frame of point cloud in the K frames of point clouds.

To be specific, a point cloud registration problem, i.e., a point cloud fusion problem, may be converted into an MAP problem. The initial pose of each frame of point cloud in the K frames of point cloud is taken as prior of the MAP problem, the first point cloud relation graph is taken as a registration measurement condition for the point clouds, and registration optimization on the point clouds is taken as likelihood of the MAP problem.

Figure 2:
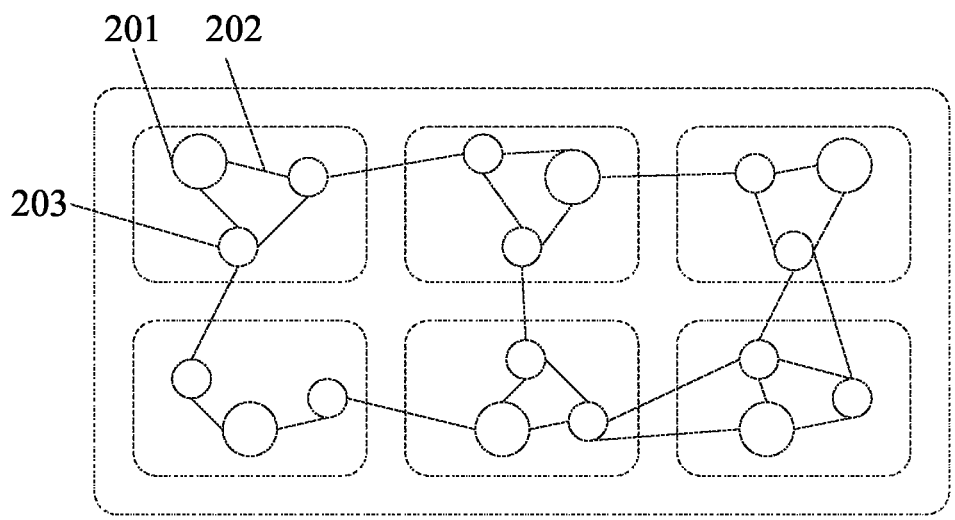
FIG. 2 is a schematic view showing a node graph created during point cloud registration.

In addition, the MAP problem may also be converted into a nonlinear least square problem, and iterative optimization is performed on the nonlinear least square problem through a nonlinear optimization library Ceres so as to obtain a first relative pose of each node in the K nodes. During the optimization of the MAP problem, by means of a Bayes structure, each frame of point cloud in the K frames of point clouds is taken as a node, so as to obtain K nodes corresponding to the K frames of point clouds respectively. An association relation among the frames of point clouds in the first point cloud relation graph is taken as an edge constraint on the K nodes, and a pose of each of the K nodes is optimized in accordance with the initial pose. As shown in FIG. 2, a node 201 is created with respect to each frame of point cloud, i.e., K nodes are obtained. Next, connection edges 202 of the K nodes are created in accordance with the association relation among the frames of point clouds in the first point cloud relation graph. Then, the pose of each node in the K nodes is optimized in accordance with the initial pose of each frame of point cloud, so as to obtain the first relative pose of each node in the K nodes.

In addition, the MAP problem may also be converted into a nonlinear least square problem, and iterative optimization is performed on the nonlinear least square problem through a nonlinear optimization library Ceres so as to obtain the first relative pose of each node in the K nodes.

When the sub-blocks have been obtained, the pose of each node (i.e., each frame of point cloud) in each sub-block is optimized, and then the pose of the node (i.e., the frame of point cloud) which serves as an associative role between the sub-blocks (e.g., a node 203 in FIG. 2) is optimized, so as to finally obtain the first relative pose of each node in the K nodes. In this way, it is able to achieve the distributed parallelization.

The first relative pose is determined as the target relative pose of the point cloud. Alternatively, after determining the first relative pose, an association relation of a target node in the K nodes is determined in accordance with the first relative pose, the association relation is taken as an edge constraint on the target node to optimize the pose of the target node, and then the optimized relative pose of the target node is returned to each node so as to obtain the target relative pose of the point cloud. A specific mode will be described hereinafter, and thus will not be particularly defined herein.

In this embodiment of the present disclosure, each frame of point cloud in the K frames of point clouds is taken as a node so as to obtain the K nodes corresponding to the K frames of point clouds respectively. Next, the association relation among the frames of points in the first point cloud relation graph is taken as the edge constraint on the K nodes, and the pose of each node in the K nodes is optimized in accordance with the initial pose, so as to obtain constraint of the first relative pose of each node in the K nodes. Then, the target relative pose of each frame of point cloud in the K frames of point clouds is determined in accordance with the first relative pose of each node in the K nodes. In this way, it is able to perform the point cloud registration on the K frames of point clouds, thereby to obtain the map through splicing.

In a possible embodiment of the present disclosure, the K frames of point clouds are divided into M blocks, each block includes N sub-blocks, and the determining the target relative pose of each frame of point cloud in the K frames of point clouds in accordance with the first relative pose of each node in the K nodes includes: obtaining P target nodes in the K nodes, each target node being a node corresponding to a third target frame of point cloud in the sub-block, P being an integer greater than 1; taking an association relation among the P target nodes determined in accordance with the first relative pose of each node in the P target nodes as an edge constraint on the P target nodes, and optimizing the pose of each target node in the P target nodes in accordance with the initial pose of each target node in the P target nodes, so as to obtain a second relative pose of each target node in the P target nodes; and determining the target relative pose of each frame of point cloud in the K frames of point clouds in accordance with the second relative pose of each target node in the P target nodes.

In this embodiment of the present disclosure, the target node is a node corresponding to the third target frame of point cloud in the sub-block, and the third target frame of point cloud is any frame of point cloud in the sub-block, e.g., a key frame of point cloud in the sub-block.

For example, the target node corresponding to the key frame of point cloud in each sub-block is selected from the K nodes, so as to obtain P target nodes.

During the point cloud registration, a certain measurement merely affects several stages around the measurement, so a certain frame of point cloud is merely associated with the frames of point clouds around it, i.e., it merely affects the other frames of point clouds around it. Hence, during the point cloud registration, the K frames of point clouds are divided into a plurality of blocks so as to perform the distributed parallelization.

Meanwhile, a hierarchical optimization structure is created. At first, the pose is optimized at a bottom layer, so as to obtain the first relative pose of each node in the K nodes, i.e., the pose of each frame of point cloud is optimized, and then it is propagated from bottom to top in a layer-by-layer manner. A constraint on the first relative pose serves as a posterior part of an edge in the map. In other words, the association elation of each third target frame of point cloud, i.e., each target node, is determined in accordance with the relative pose of the target node obtained through optimization, i.e., the third target frame of point cloud (e.g., the key frame of point cloud in each sub-block), and then it is taken as an edge constraint between the frames of point clouds at an upper layer. The pose of the third target frame of point cloud is continuously optimized to modify the relative poses of a part of the frames of point clouds, so as to obtain the second relative pose of each node in the P target nodes.

When a modification amount of each frame of point cloud is smaller than a predetermined threshold during the bottom-to-top propagation, the bottom-to-top propagation is stopped.

Figure 3:
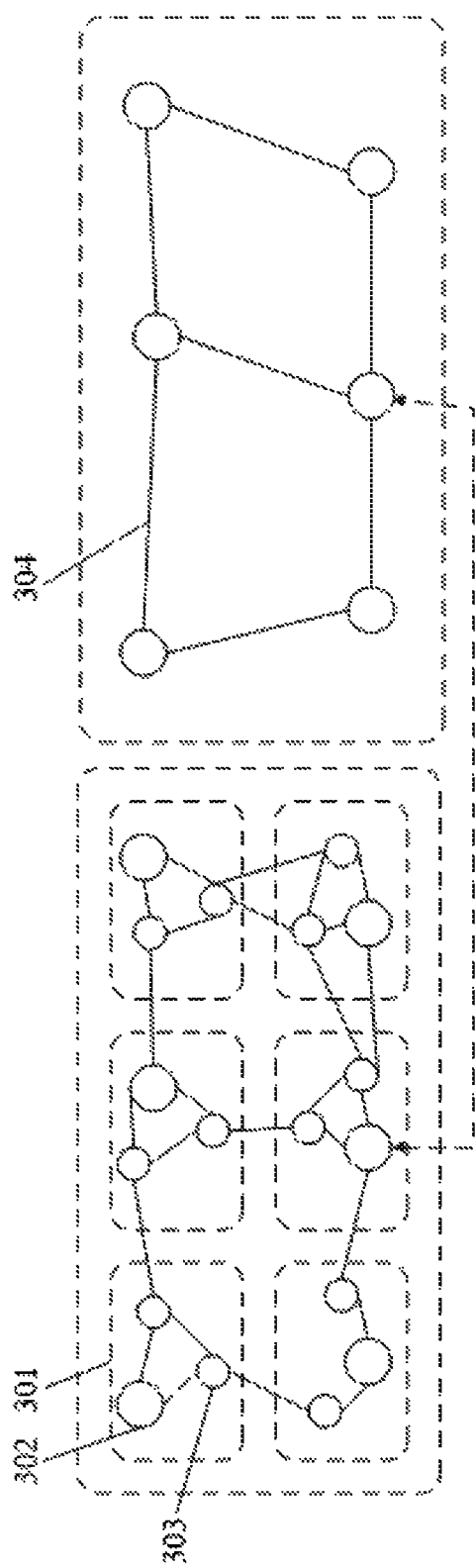
FIG. 3 is a schematic view showing the node graph with a hierarchical structure created during the point cloud registration.

As shown in FIG. 3, a left graph is a node graph at a bottom layer and includes a plurality of sub-blocks 301, and each sub-block includes a target node 302 (also called as root node) corresponding to the key frame of point cloud and nodes 303 (also called as child nodes) corresponding to the other frames of point clouds. A right graph is a node graph at an upper layer relative to the bottom layer and includes the root nodes in the sub-blocks. After the first relative pose of each node has been obtained through optimizing the nodes at the bottom layer, the association relation among the P target nodes is determined in accordance with the first relative pose of each node in the P target nodes, and then it is taken as a connection edge 304 between the adjacent target nodes in the P target nodes.

The target relative pose of each frame of point cloud in the K frames of point cloud is obtained through superimposing the relative poses of a part of frames of point clouds obtained through modification and the non-modified first relative pose of the frame of point cloud at the bottom layer. Alternatively, the relative pose of each frame of point cloud at the upper layer obtained through optimization is propagated downward to each frame of point cloud at the bottom layer, so as to obtain the target relative pose of each frame of point cloud in the K frames of point cloud. In this way, it is able to obtain a hierarchical, bottom-to-top or top-to-bottom, iterative optimization mode, so as to add new data rapidly. Merely a relevant part in the map, e.g., a newly-added part and its upper-layer part, is updated with the new data, so it is able to facilitate the distributed parallelization and increase the data in an incremental manner.

The layers are divided in an ascending order of sizes of sub-regions. A frame of point cloud at the bottom layer corresponds to a smallest sub-region. In addition, the quantity of layers will not be particularly defined herein. In this embodiment of the present disclosure, the pose of the point cloud may also be optimized in a hierarchical manner in accordance with a three-layered data structure consisting of the frame of point cloud, the sub-block and the block, so as to optimize the pose in a hierarchical manner, thereby to improve the point cloud registration accuracy as well as the point cloud fusion effect.

In a possible embodiment of the present disclosure, the determining the target relative pose of each frame of point cloud in the K frames of point clouds in accordance with the second relative pose of each target node in the P target nodes includes, in the case that a target difference is smaller than a predetermined threshold, optimizing the pose of each node in the K nodes in accordance with the second relative pose of each target node in the P target nodes and the initial pose of each node in the K nodes, so as to obtain the target relative pose of each frame of point cloud in the K frames of point clouds. The target difference is a difference between P second relative poses of the P target nodes and P first relative poses of the P target nodes.

In this embodiment of the present disclosure, the target difference is the difference between the P second relative poses of the P target nodes and the P first relative poses of the P target nodes, i.e., a modification amount of the optimized pose of each node at the upper layer relative to the optimized pose of the node at the lower layer. The target difference may be a sum of the P differences, or an average of the P differences. With respect to one target node, the difference indicates a difference between the second relative pose of the target node and the first relative pose of the target node, which will not be particularly defined herein.

The predetermined threshold may be set according to the practical need. Usually, the predetermined threshold is provided with a small value, so as to ensure a modification effect.

In the case that the modification amount is smaller than the predetermined threshold, the pose of each node in the K nodes is optimized in accordance with the second relative pose of each target node in the P target nodes and the initial pose of each node in the K nodes, so as to obtain the target relative pose of each frame of point cloud in the K frames of point clouds. To be specific, an edge of a node at a lower layer, e.g., an edge of each frame of point cloud belonging to different sub-blocks, is optimized in accordance with the second relative pose of each target node in the P target nodes, the optimized edge is taken as an edge constraint, and then the pose of each node in the K nodes is optimized in accordance with the initial pose of each node in the K nodes. In other words, the optimized relative pose of each frame of point cloud at the upper layer is propagated downward to each frame of point cloud at the lower layer, so as to obtain the target relative pose of each frame of point cloud in the K frames of point clouds.

In this way, it is able to obtain a hierarchical, bottom-to-top or top-to-bottom, iterative optimization mode, so as to add new data rapidly. Merely a relevant part in the map, e.g., a newly-added part and its upper-layer part, is updated with the new data, so it is able to facilitate the distributed parallelization and increase the data in an incremental manner. Hence, the method may be applied to a large-scale point cloud reconstruction scenario, conveniently deployed in a distributed cloud computing system, and applied to various scenarios such as flyover, expressway and urban road.

In a possible embodiment of the present disclosure, prior to optimizing the pose of each node in the K nodes in accordance with the initial pose so as to obtain the first relative pose of each node in the K nodes, the high-definition map creation method further includes obtaining target altitude values of L point cloud collection trajectories with respect to the target region, and the optimizing the pose of each node in the K nodes in accordance with the initial pose so as to obtain the first relative pose of each node in the K nodes includes taking the target altitude values as a constraint on an altitude average in the relative pose, and optimizing the pose of each node in the K nodes in accordance with the initial pose, so as to obtain the first relative pose of each node in the K nodes.

In this embodiment of the present disclosure, the target altitude value is an altitude value of each of the L point cloud collection trajectories with respect to the target region, and it is used to indicate an altitude value at a position where each frame of point cloud is located.

In the case that L is equal to 1, the altitude value of the point cloud collection trajectory with respect to the target region is the target altitude value. In some scenarios, a satellite searched by GPS for post-processing is partially shielded, so some altitude values are generated randomly during the initial positioning. In addition, with respect to the target region, generally a plurality of point cloud collection trajectories is collected, so that the collected data completely covers the target region. Hence, the altitude values of the plurality of point cloud collection trajectories are selected to determine an optimal altitude value of the point cloud collection trajectory as the target altitude value. Correspondingly, the altitude value at the position where each frame of point cloud is located is approximately determined.

Next, the target altitude value is taken as a constraint on an altitude average in the relative pose. To be specific, a priori weight of the altitude value in the pose is created through Gaussian distribution, and the optimal altitude value is a Gaussian average. The pose of each node in the K nodes is optimized in accordance with the initial pose, so as to obtain the first relative pose of each node in the K nodes. In this way, the priori weight of the pose altitude drift is decreased during pose the drift, so as to prevent the pose optimization from being adversely affected by the pose altitude drift, thereby to remarkably increase the point cloud fusion effect.

Second Embodiment

Figure 4:
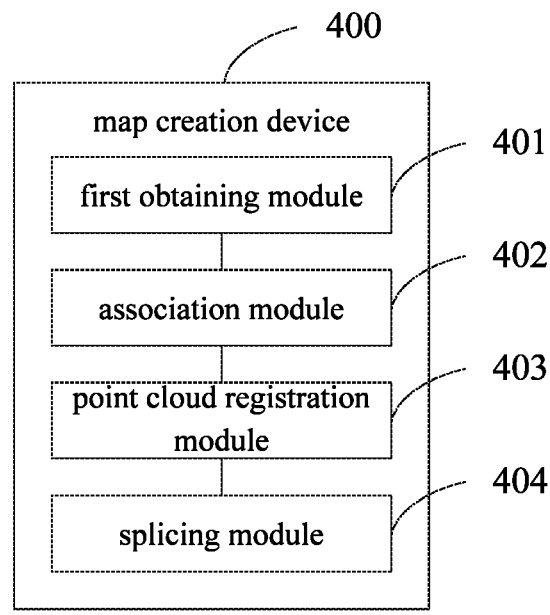
FIG. 4 is a schematic view showing a high-definition map creation device according to a second embodiment of the present disclosure.

As shown in FIG. 4, the present disclosure provides in some embodiments a high-definition map creation device 400, which includes: a first obtaining module 401 configured to obtain point cloud data collected with respect to a target region, the point cloud data including K frames of point clouds and an initial pose of each frame of point cloud, K being an integer greater than 1; an association module 402 configured to associate the K frames of point clouds with each other in accordance with the initial pose, so as to obtain a first point cloud relation graph of the K frames of point clouds; a point cloud registration module 403 configured to perform point cloud registration on the K frames of point clouds in accordance with the first point cloud relation graph and the initial pose, so as to obtain a target relative pose of each frame of point cloud in the K frames of point clouds; and a splicing module 404 configured to splice the K frames of point clouds in accordance with the target relative pose, so as to obtain a point cloud map of the target region.

In a possible embodiment of the present disclosure, the association module 402 includes: a block division sub-module configured to divide the K frames of point clouds into M blocks in accordance with the initial pose, adjacent blocks including at least one same frame of point cloud, M being a positive integer; a first association sub-module configured to associate the frames of point clouds in each block with each other, so as to obtain a second point cloud relation graph of the block; and a second association sub-module configured to associate the M second point cloud relation graphs of the M blocks with each other in accordance with the at least one same frame of point cloud, so as to obtain the first point cloud relation graph.

In a possible embodiment of the present disclosure, the block division sub-module is specifically configured to: divide the K frames of point clouds into N sub-blocks in accordance with the initial pose and target sub-trajectories, each sub-block including frames of point clouds collected on one target sub-trajectory, each target sub-trajectory being a consecutive trajectory on any point cloud collection trajectory of L point cloud collection trajectories with respect to the target region, one point cloud collection trajectory including one target sub-trajectory or a plurality of consecutive target sub-trajectories, L being a positive integer, and N being an integer greater than 1; and divide the N sub-blocks into M blocks in accordance with a positional relationship among the sub-blocks, each block including the sub-blocks in a space with a predetermined size, at least a part of sub-blocks in a first block being different from sub-blocks in a second block, the first block being any block in the M blocks, and the second block being a block in the M blocks different from the first block.

In a possible embodiment of the present disclosure, the first association sub-module is specifically configured to perform at least one of: with respect to each frame of point cloud in the block, associating point clouds in the block spaced apart from the point cloud by a distance within a predetermined range with each other, so as to obtain the second point cloud relation graph; with respect to any point cloud collection trajectory in the target region, associating the frames of point clouds in the block collected at adjacent time points in accordance with the point cloud collection trajectory and a direction of the point cloud collection trajectory, so as to obtain the second point cloud relation graph; or associating a first target frame of point cloud in the block collected in accordance with a first point cloud collection trajectory with a second target frame of point cloud in the block collected in accordance with a second point cloud collection trajectory, so as to obtain the second point cloud relation graph, the first point cloud collection trajectory and the second point cloud collection trajectory being different point cloud collection trajectories with respect to the target region, the second target frame of point cloud being located in a line perpendicular to a direction of the first point cloud collection trajectory, and an initial pose of the second target frame of point cloud being adjacent to an initial pose of the first target frame of point cloud.

In a possible embodiment of the present disclosure, the point cloud registration module 403 includes: an obtaining sub-module configured to take each frame of point cloud in the K frames of point clouds as a node, so as to obtain K nodes corresponding to the K frames of point clouds respectively; an optimization sub-module configured to take an association relation among the frames of points in the first point cloud relation graph as an edge constraint on the K nodes, and optimize a pose of each node in the K nodes in accordance with the initial pose, so as to obtain a first relative pose of each node in the K nodes; and a determination sub-module configured to determine the target relative pose of each frame of point cloud in the K frames of point clouds in accordance with the first relative pose of each node in the K nodes.

In a possible embodiment of the present disclosure, the K frames of point clouds are divided into M blocks, and each block includes N sub-blocks. The determination sub-module includes: a node obtaining unit configured to obtain P target nodes in the K nodes, each target node being a node corresponding to a third target frame of point cloud in the sub-block, P being an integer greater than 1; a pose optimization unit configured to take an association relation among the P target nodes determined in accordance with the first relative pose of each node in the P target nodes as an edge constraint on the P target nodes, and optimize the pose of each target node in the P target nodes in accordance with the initial pose of each target node in the P target nodes, so as to obtain a second relative pose of each target node in the P target nodes; and a determination unit configured to determine the target relative pose of each frame of point cloud in the K frames of point clouds in accordance with the second relative pose of each target node in the P target nodes.

In a possible embodiment of the present disclosure, the determination unit is specifically configured to, in the case that a target difference is smaller than a predetermined threshold, optimize the pose of each node in the K nodes in accordance with the second relative pose of each target node in the P target nodes and the initial pose of each node in the K nodes, so as to obtain the target relative pose of each frame of point cloud in the K frames of point clouds. The target difference is a difference between P second relative poses of the P target nodes and P first relative poses of the P target nodes.

In a possible embodiment of the present disclosure, the high-definition map creation device further includes a second obtaining module configured to obtain target altitude values of L point cloud collection trajectories with respect to the target region. The optimization sub-module is specifically configured to take the target altitude values as a constraint on an altitude average in the relative pose, and optimize the pose of each node in the K nodes in accordance with the initial pose, so as to obtain the first relative pose of each node in the K nodes.

The high-definition map creation device 400 in this embodiment of the present disclosure is capable of implementing the above-mentioned high-definition map creation method with a same beneficial effect, and thus will not be particularly defined herein.

The collection, storage, usage, processing, transmission, supply and publication of personal information involved in the embodiments of the present disclosure comply with relevant laws and regulations, and do not violate the principle of the public order.

The present disclosure further provides in some embodiments an electronic device, a computer-readable storage medium and a computer program product.

Figure 5:
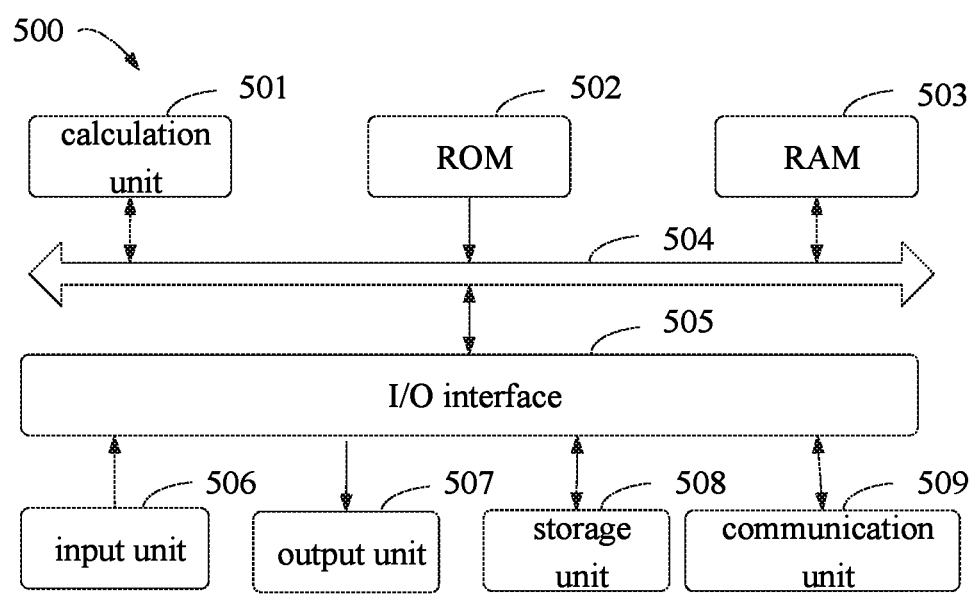
FIG. 5 is a block diagram of an electronic device according to one embodiment of the present disclosure.

FIG. 5 is a schematic block diagram of an exemplary electronic device 500 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 5, the electronic device 500 includes a computing unit 501 configured to execute various processings in accordance with computer programs stored in a Read Only Memory (ROM) 502 or computer programs loaded into a Random Access Memory (RAM) 503 via a storage unit 508. Various programs and data desired for the operation of the electronic device 500 may also be stored in the RAM 503. The computing unit 501, the ROM 502 and the RAM 503 may be connected to each other via a bus 504. In addition, an input/output (I/O) interface 505 may also be connected to the bus 504.

Multiple components in the electronic device 500 are connected to the I/O interface 505. The multiple components include: an input unit 506, e.g., a keyboard, a mouse and the like; an output unit 507, e.g., a variety of displays, loudspeakers, and the like; a storage unit 508, e.g., a magnetic disk, an optic disk and the like; and a communication unit 509, e.g., a network card, a modem, a wireless transceiver, and the like. The communication unit 509 allows the electronic device 500 to exchange information/data with other devices through a computer network and/or other telecommunication networks, such as the Internet.

The computing unit 501 may be any general purpose and/or special purpose processing components having a processing and computing capability. Some examples of the computing unit 501 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 501 carries out the aforementioned methods and processes, e.g., the high-definition map creation method. For example, in some embodiments of the present disclosure, the high-definition map creation method may be implemented as a computer software program tangibly embodied in a machine readable medium such as the storage unit 508. In some embodiments of the present disclosure, all or a part of the computer program may be loaded and/or installed on the electronic device 500 through the ROM 502 and/or the communication unit 509. When the computer program is loaded into the RAM 503 and executed by the computing unit 501, one or more steps of the foregoing high-definition map creation method may be implemented. Optionally, in some other embodiments of the present disclosure, the computing unit 501 may be configured in any other suitable manner (e.g., by means of firmware) to implement the high-definition map creation method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server may be a cloud server, a server of a distributed system, or a server combined with blockchain.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A high-definition map creation method implemented by an electronic device, the high-definition map creation method comprising:
   obtaining point cloud data collected with respect to a target region, the point cloud data comprising K frames of point clouds and an initial pose of each frame of point cloud, K being an integer greater than 1;
   associating the K frames of point clouds with each other in accordance with the initial pose, so as to obtain a first point cloud relation graph of the K frames of point clouds;
   performing point cloud registration on the K frames of point clouds in accordance with the first point cloud relation graph and the initial pose, so as to obtain a target relative pose of each frame of point cloud in the K frames of point clouds; and
   splicing the K frames of point clouds in accordance with the target relative pose, so as to obtain a point cloud map of the target region,
   wherein the associating the K frames of point clouds with each other in accordance with the initial pose so as to obtain the first point cloud relation graph of the K frames of point clouds comprises:
      dividing the K frames of point clouds into M blocks in accordance with the initial pose, adjacent blocks comprising at least one same frame of point cloud, M being a positive integer;
      associating the frames of point clouds in each block with each other, so as to obtain a second point cloud relation graph of the block; and
      associating the M second point cloud relation graphs of the M blocks with each other in accordance with the at least one same frame of point cloud, so as to obtain the first point cloud relation graph.

2. The high-definition map creation method according to claim 1, wherein the dividing the K frames of point clouds into the M blocks in accordance with the initial pose comprises:
   dividing the K frames of point clouds into N sub-blocks in accordance with the initial pose and target sub-trajectories, each sub-block comprising frames of point clouds collected on one target sub-trajectory, each target sub-trajectory being a consecutive trajectory on any point cloud collection trajectory of L point cloud collection trajectories with respect to the target region, one point cloud collection trajectory comprising one target sub-trajectory or a plurality of consecutive target sub-trajectories, L being a positive integer, and N being an integer greater than 1; and
   dividing the N sub-blocks into M blocks in accordance with a positional relationship among the sub-blocks, each block comprising the sub-blocks in a space with a predetermined size, at least a part of sub-blocks in a first block being different from sub-blocks in a second block, the first block being any block in the M blocks, and the second block being a block in the M blocks different from the first block.

3. The high-definition map creation method according to claim 1, wherein the associating the frames of point clouds in each block with each other so as to obtain the second point cloud relation graph comprises at least one of:
   with respect to each frame of point cloud in the block, associating point clouds in the block spaced apart from the point cloud by a distance within a predetermined range with each other, so as to obtain the second point cloud relation graph;
   with respect to any point cloud collection trajectory in the target region, associating the frames of point clouds in the block collected at adjacent time points in accordance with the point cloud collection trajectory and a direction of the point cloud collection trajectory, so as to obtain the second point cloud relation graph; or
   associating a first target frame of point cloud in the block collected in accordance with a first point cloud collection trajectory with a second target frame of point cloud in the block collected in accordance with a second point cloud collection trajectory, so as to obtain the second point cloud relation graph, the first point cloud collection trajectory and the second point cloud collection trajectory being different point cloud collection trajectories with respect to the target region, the second target frame of point cloud being located in a line perpendicular to a direction of the first point cloud collection trajectory, and an initial pose of the second target frame of point cloud being adjacent to an initial pose of the first target frame of point cloud.

4. The high-definition map creation method according to claim 1, wherein the performing the point cloud registration on the K frames of point clouds in accordance with the first point cloud relation graph and the initial pose so as to obtain the target relative pose of each frame of point cloud in the K frames of point clouds comprises:
   taking each frame of point cloud in the K frames of point clouds as a node, so as to obtain K nodes corresponding to the K frames of point clouds respectively;
   taking an association relation among the frames of points in the first point cloud relation graph as an edge constraint on the K nodes, and optimizing a pose of each node in the K nodes in accordance with the initial pose, so as to obtain a first relative pose of each node in the K nodes; and
   determining the target relative pose of each frame of point cloud in the K frames of point clouds in accordance with the first relative pose of each node in the K nodes.

5. The high-definition map creation method according to claim 4, wherein the K frames of point clouds are divided into M blocks, each block comprises N sub-blocks, and the determining the target relative pose of each frame of point cloud in the K frames of point clouds in accordance with the first relative pose of each node in the K nodes comprises:
   obtaining P target nodes in the K nodes, each target node being a node corresponding to a third target frame of point cloud in the sub-block, P being an integer greater than 1;
   taking an association relation among the P target nodes determined in accordance with the first relative pose of each node in the P target nodes as an edge constraint on the P target nodes, and optimizing the pose of each target node in the P target nodes in accordance with the initial pose of each target node in the P target nodes, so as to obtain a second relative pose of each target node in the P target nodes; and
   determining the target relative pose of each frame of point cloud in the K frames of point clouds in accordance with the second relative pose of each target node in the P target nodes.

6. The high-definition map creation method according to claim 5, wherein the determining the target relative pose of each frame of point cloud in the K frames of point clouds in accordance with the second relative pose of each target node in the P target nodes comprises:
   in the case that a target difference is smaller than a predetermined threshold, optimizing the pose of each node in the K nodes in accordance with the second relative pose of each target node in the P target nodes and the initial pose of each node in the K nodes, so as to obtain the target relative pose of each frame of point cloud in the K frames of point clouds, wherein the target difference is a difference between P second relative poses of the P target nodes and P first relative poses of the P target nodes.

7. The high-definition map creation method according to claim 4, wherein prior to optimizing the pose of each node in the K nodes in accordance with the initial pose so as to obtain the first relative pose of each node in the K nodes, the high-definition map creation method further comprises:
   obtaining target altitude values of L point cloud collection trajectories with respect to the target region, and the optimizing the pose of each node in the K nodes in accordance with the initial pose so as to obtain the first relative pose of each node in the K nodes comprises taking the target altitude values as a constraint on an altitude average in the relative pose, and optimizing the pose of each node in the K nodes in accordance with the initial pose, so as to obtain the first relative pose of each node in the K nodes.

8. An electronic device, comprising at least one processor, and a memory in communication with the at least one processor, wherein the memory is configured to store therein an instruction to be executed by the at least one processor, and the instruction is executed by the at least one processor so as to implement a high-definition map creation method, the high-definition map creation method comprising:
   obtaining point cloud data collected with respect to a target region, the point cloud data comprising K frames of point clouds and an initial pose of each frame of point cloud, K being an integer greater than 1;
   associating the K frames of point clouds with each other in accordance with the initial pose, so as to obtain a first point cloud relation graph of the K frames of point clouds;
   performing point cloud registration on the K frames of point clouds in accordance with the first point cloud relation graph and the initial pose, so as to obtain a target relative pose of each frame of point cloud in the K frames of point clouds; and
   splicing the K frames of point clouds in accordance with the target relative pose, so as to obtain a point cloud map of the target region,
   wherein the associating the K frames of point clouds with each other in accordance with the initial pose so as to obtain the first point cloud relation graph of the K frames of point clouds comprises:
      dividing the K frames of point clouds into M blocks in accordance with the initial pose, adjacent blocks comprising at least one same frame of point cloud, M being a positive integer;
      associating the frames of point clouds in each block with each other, so as to obtain a second point cloud relation graph of the block; and
      associating the M second point cloud relation graphs of the M blocks with each other in accordance with the at least one same frame of point cloud, so as to obtain the first point cloud relation graph.

9. The electronic device according to claim 8, wherein the dividing the K frames of point clouds into the M blocks in accordance with the initial pose comprises:
   dividing the K frames of point clouds into N sub-blocks in accordance with the initial pose and target sub-trajectories, each sub-block comprising frames of point clouds collected on one target sub-trajectory, each target sub-trajectory being a consecutive trajectory on any point cloud collection trajectory of L point cloud collection trajectories with respect to the target region, one point cloud collection trajectory comprising one target sub-trajectory or a plurality of consecutive target sub-trajectories, L being a positive integer, and N being an integer greater than 1; and
   dividing the N sub-blocks into M blocks in accordance with a positional relationship among the sub-blocks, each block comprising the sub-blocks in a space with a predetermined size, at least a part of sub-blocks in a first block being different from sub-blocks in a second block, the first block being any block in the M blocks, and the second block being a block in the M blocks different from the first block.

10. The electronic device according to claim 8, wherein the associating the frames of point clouds in each block with each other so as to obtain the second point cloud relation graph comprises at least one of:
with respect to each frame of point cloud in the block, associating point clouds in the block spaced apart from the point cloud by a distance within a predetermined range with each other, so as to obtain the second point cloud relation graph;
with respect to any point cloud collection trajectory in the target region, associating the frames of point clouds in the block collected at adjacent time points in accordance with the point cloud collection trajectory and a direction of the point cloud collection trajectory, so as to obtain the second point cloud relation graph; or
associating a first target frame of point cloud in the block collected in accordance with a first point cloud collection trajectory with a second target frame of point cloud in the block collected in accordance with a second point cloud collection trajectory, so as to obtain the second point cloud relation graph, the first point cloud collection trajectory and the second point cloud collection trajectory being different point cloud collection trajectories with respect to the target region, the second target frame of point cloud being located in a line perpendicular to a direction of the first point cloud collection trajectory, and an initial pose of the second target frame of point cloud being adjacent to an initial pose of the first target frame of point cloud.

11. The electronic device according to claim 8, wherein the performing the point cloud registration on the K frames of point clouds in accordance with the first point cloud relation graph and the initial pose so as to obtain the target relative pose of each frame of point cloud in the K frames of point clouds comprises:
taking each frame of point cloud in the K frames of point clouds as a node, so as to obtain K nodes corresponding to the K frames of point clouds respectively;
taking an association relation among the frames of points in the first point cloud relation graph as an edge constraint on the K nodes, and optimizing a pose of each node in the K nodes in accordance with the initial pose, so as to obtain a first relative pose of each node in the K nodes; and
determining the target relative pose of each frame of point cloud in the K frames of point clouds in accordance with the first relative pose of each node in the K nodes.

12. The electronic device according to claim 11, wherein the K frames of point clouds are divided into M blocks, each block comprises N sub-blocks, and the determining the target relative pose of each frame of point cloud in the K frames of point clouds in accordance with the first relative pose of each node in the K nodes comprises:
obtaining P target nodes in the K nodes, each target node being a node corresponding to a third target frame of point cloud in the sub-block, P being an integer greater than 1;
taking an association relation among the P target nodes determined in accordance with the first relative pose of each node in the P target nodes as an edge constraint on the P target nodes, and optimizing the pose of each target node in the P target nodes in accordance with the initial pose of each target node in the P target nodes, so as to obtain a second relative pose of each target node in the P target nodes; and
determining the target relative pose of each frame of point cloud in the K frames of point clouds in accordance with the second relative pose of each target node in the P target nodes.

13. The electronic device according to claim 12, wherein the determining the target relative pose of each frame of point cloud in the K frames of point clouds in accordance with the second relative pose of each target node in the P target nodes comprises:
in the case that a target difference is smaller than a predetermined threshold, optimizing the pose of each node in the K nodes in accordance with the second relative pose of each target node in the P target nodes and the initial pose of each node in the K nodes, so as to obtain the target relative pose of each frame of point cloud in the K frames of point clouds, wherein the target difference is a difference between P second relative poses of the P target nodes and P first relative poses of the P target nodes.

14. The electronic device according to claim 11, wherein prior to optimizing the pose of each node in the K nodes in accordance with the initial pose so as to obtain the first relative pose of each node in the K nodes, the high-definition map creation method further comprises:
obtaining target altitude values of L point cloud collection trajectories with respect to the target region, and the optimizing the pose of each node in the K nodes in accordance with the initial pose so as to obtain the first relative pose of each node in the K nodes comprises taking the target altitude values as a constraint on an altitude average in the relative pose, and optimizing the pose of each node in the K nodes in accordance with the initial pose, so as to obtain the first relative pose of each node in the K nodes.

15. A non-transitory computer-readable storage medium storing therein a computer instruction, wherein the computer instruction is executed by a computer so as to implement a high-definition map creation map, which comprises:
obtaining point cloud data collected with respect to a target region, the point cloud data comprising K frames of point clouds and an initial pose of each frame of point cloud, K being an integer greater than 1;
associating the K frames of point clouds with each other in accordance with the initial pose, so as to obtain a first point cloud relation graph of the K frames of point clouds;
performing point cloud registration on the K frames of point clouds in accordance with the first point cloud relation graph and the initial pose, so as to obtain a target relative pose of each frame of point cloud in the K frames of point clouds; and splicing the K frames of point clouds in accordance with the target relative pose, so as to obtain a point cloud map of the target region, wherein the associating the K frames of point clouds with each other in accordance with the initial pose so as to obtain the first point cloud relation graph of the K frames of point clouds comprises:
dividing the K frames of point clouds into M blocks in accordance with the initial pose, adjacent blocks comprising at least one same frame of point cloud, M being a positive integer;
associating the frames of point clouds in each block with each other, so as to obtain a second point cloud relation graph of the block; and associating the M second point cloud relation graphs of the M blocks with each other in accordance with the at least one same frame of point cloud, so as to obtain the first point cloud relation graph.

16. The non-transitory computer-readable storage medium according to claim 15, wherein the dividing the K frames of point clouds into the M blocks in accordance with the initial pose comprises: dividing the K frames of point clouds into N sub-blocks in accordance with the initial pose and target sub-trajectories, each sub-block comprising frames of point clouds collected on one target sub-trajectory, each target sub-trajectory being a consecutive trajectory on any point cloud collection trajectory of L point cloud collection trajectories with respect to the target region, one point cloud collection trajectory comprising one target sub-trajectory or a plurality of consecutive target sub-trajectories, L being a positive integer, and N being an integer greater than 1; and dividing the N sub-blocks into M blocks in accordance with a positional relationship among the sub-blocks, each block comprising the sub-blocks in a space with a predetermined size, at least a part of sub-blocks in a first block being different from sub-blocks in a second block, the first block being any block in the M blocks, and the second block being a block in the M blocks different from the first block.

17. The non-transitory computer-readable storage medium according to claim 15, wherein the associating the frames of point clouds in each block with each other so as to obtain the second point cloud relation graph comprises at least one of:
- with respect to each frame of point cloud in the block, associating point clouds in the block spaced apart from the point cloud by a distance within a predetermined range with each other, so as to obtain the second point cloud relation graph;
- with respect to any point cloud collection trajectory in the target region, associating the frames of point clouds in the block collected at adjacent time points in accordance with the point cloud collection trajectory and a direction of the point cloud collection trajectory, so as to obtain the second point cloud relation graph; or
- associating a first target frame of point cloud in the block collected in accordance with a first point cloud collection trajectory with a second target frame of point cloud in the block collected in accordance with a second point cloud collection trajectory, so as to obtain the second point cloud relation graph, the first point cloud collection trajectory and the second point cloud collection trajectory being different point cloud collection trajectories with respect to the target region, the second target frame of point cloud being located in a line perpendicular to a direction of the first point cloud collection trajectory, and an initial pose of the second target frame of point cloud being adjacent to an initial pose of the first target frame of point cloud.

* * * * *